(12) United States Patent
McNeil et al.

(10) Patent No.: US 6,343,567 B1
(45) Date of Patent: Feb. 5, 2002

(54) SYNTHETIC AQUATIC STRUCTURE AND METHOD

(75) Inventors: Roderick J. McNeil, Polson, MT (US); William Henry Bilawa, Washington, DC (US); Nicholas Ramon Innerbichler, Ellicott City, MD (US)

(73) Assignee: Marine Environmental Solutions, L.L.C., Calverton, MD (US)

( * ) Notice: Subject to any disclaimer, the term of this patent is extended or adjusted under 35 U.S.C. 154(b) by 0 days.

(21) Appl. No.: 09/293,947

(22) Filed: Apr. 19, 1999

Related U.S. Application Data (63) Continuation-in-part of application No. 09/134,735, filed on Aug. 14, 1998.

(51) Int. Cl.⁷ .............................................. A01K 61/00
(52) U.S. Cl. ............................................................ 119/256
(58) Field of Search ........................... 428/304.4, 316.6; 119/221, 256; 405/24; 442/326

(56) References Cited

U.S. PATENT DOCUMENTS

| | | | |
|---|---|---|---|
| 3,299,640 A | | 1/1967 | Nielsen |
| 3,540,415 A | | 11/1970 | Bromley |
| 3,559,407 A | | 2/1971 | Schuur |
| 3,590,585 A | | 7/1971 | De Winter |
| 3,820,339 A | | 6/1974 | Luque |
| 3,841,266 A | | 10/1974 | Hoshino |
| 4,130,994 A | | 12/1978 | Van Moss, Jr. |
| 4,221,500 A | * | 9/1980 | Garrett ........................ 405/24 |
| 4,337,007 A | * | 6/1982 | Smith ........................... 405/24 |
| 4,374,629 A | | 2/1983 | Garrett |
| 4,437,786 A | | 3/1984 | Morrisroe |
| 4,441,453 A | | 4/1984 | McMickle et al. |
| 4,478,533 A | | 10/1984 | Garrett |
| 4,490,071 A | | 12/1984 | Morrisroe |
| 4,534,675 A | * | 8/1985 | Morrisroe ..................... 405/24 |
| 4,641,997 A | | 2/1987 | Lauer et al. |
| 4,657,432 A | * | 4/1987 | Rentrop et al. ................ 405/24 |
| 4,699,829 A | | 10/1987 | Willinger |
| 4,722,639 A | | 2/1988 | Alsop |
| 4,818,579 A | | 4/1989 | Uchida |
| 4,950,104 A | | 8/1990 | Streichenberger |
| 5,113,792 A | | 5/1992 | Jones et al. |
| 5,176,469 A | | 1/1993 | Alsop |
| 5,255,480 A | | 10/1993 | Alsop |
| 5,309,672 A | | 5/1994 | Spencer et al. |
| 5,575,584 A | | 11/1996 | Alsop |
| 5,639,657 A | | 6/1997 | Saiki et al. |
| 5,669,330 A | | 9/1997 | O'Hare |
| 5,871,303 A | | 2/1999 | Brown, III et al. |
| 5,876,151 A | * | 3/1999 | Brown, III et al. ........... 405/24 |
| 5,884,585 A | * | 3/1999 | Streichenberger ........... 119/221 |
| 5,961,251 A | * | 10/1999 | Prendergast .................. 405/24 |
| 6,060,153 A | * | 5/2000 | NcNeil ..................... 428/316.6 |
| 6,171,686 B1 | * | 1/2001 | NcNeil ..................... 428/304.4 |

FOREIGN PATENT DOCUMENTS

| | | |
|---|---|---|
| DE | 1811506 | 7/1969 |
| GB | 1176772 | 1/1970 |
| GB | 1385974 | 3/1975 |
| JP | 54-70989 | 6/1979 |
| JP | 07307326 | 6/1997 |
| WO | WO 85/03539 | 8/1985 |

\* cited by examiner

Primary Examiner—Thomas Price
(74) Attorney, Agent, or Firm—Dickstein Shapiro Morin & Oshinsky LLP

(57) ABSTRACT

A neutrally buoyant synthetic aquatic structure may be used to treat a body of water by removing nutrients and other materials from the water. According to another aspect of the invention, the synthetic structure may be used to promote and/or control the growth of aquatic species in a body of water. In a preferred embodiment of the invention, a denser-than-water ballast portion is suspended from buoyant material to stabilize and orient the synthetic structure. A high surface area structure for promoting biological growth may be provided. The ballast portion does not sink to the bottom of the body of water. Consequently, the high surface area structure may be maintained in the photic zone.

22 Claims, 5 Drawing Sheets

SYNTHETIC AQUATIC STRUCTURE AND METHOD

This is a continuation-in-part of U.S. patent application Ser. No. 09/134,735, filed Aug. 14, 1998, the entire disclosure of which is incorporated herein by reference.

BACKGROUND OF THE INVENTION

The present invention relates generally to systems for controlling and/or improving the quality of aquatic environments.

The present invention also relates to aquatic treatment systems for biologically removing nutrients and other materials from water.

The present invention also relates to synthetic structures for promoting and/or controlling the growth of aquatic species.

Systems for improving aquatic habitats are referred to in U.S. Pat. No. 5,669,330 (O'Hare), U.S. Pat. No. 5,639,657 (Saiki), U.S. Pat. No. 4,950,104 (Streichenberger), U.S. Pat. No. 4,818,579 (Uchida) and U.S. Pat. No. 4,441,453 (McMickle). A floating open ocean farm system is referred to in U.S. Pat. No. 5,309,672 (Spencer). A system for cultivating crustaceans in water is described in U.S. Pat. No. 3,841,266 (Hoshino).

SUMMARY OF THE INVENTION

The present invention relates to a neutrally buoyant synthetic aquatic structure. The structure may be used to treat a body of water by removing nutrients and other materials from the water. According to another aspect of the invention, the synthetic structure may be used to promote and/or control the growth of aquatic species in a body of water.

In a preferred embodiment of the invention, the neutrally buoyant synthetic structure is formed of flexible buoyant material connected to a denser-than-water ballast portion. The ballast portion is suspended from the buoyant material to stabilize and orient the synthetic structure. The buoyant material may have a high surface area structure for promoting biological growth. The ballast portion does not sink to the bottom of the body of water. Consequently, the high surface area structure may be maintained in the photic zone.

The high surface area structure may be formed of a variety of materials, including but not limited to needle punched thread, open cell foam, polyolefin or spun polyester batting and microporous granular particles.

The ballast portion may be formed of a heavy wire enclosed in the flexible buoyant material. The ends of the wire may be used to connect the synthetic structure to another, similarly constructed synthetic structure. Alternatively, a polyester rope may be used along the bottom edge of the synthetic structure to connect multiple synthetic structures end to end. According to another aspect of the invention, the ballast portion may include granular material, such as sand or gravel. The sand or gravel may be measured to provide the desired neutral buoyancy for the synthetic structure.

The present invention also relates to a synthetic structure for providing food for fish and other biological species. The structure may be provided with a flexible active portion for promoting biological growth, and a ballast portion for stabilizing the synthetic structure in the water. In a preferred embodiment of the invention, the synthetic structure as a whole is neutrally buoyant such that the flexible active portion is maintained in the photic zone.

According to one aspect of the invention, a flexible connecting portion may be used to connect the ballast portion to the flexible active portion. The connecting portion may be used to promote neutral buoyancy of the entire structure. The connecting portion may be formed, for example, of a fibril material. The connecting portion may be formed, if desired, of a spun polyester batting material that promotes biological growth. The material for the connecting portion itself may be neutrally buoyant. The material preferably should be durable to withstand product lifetimes of three to four years or more.

As an alternative to the structures described above, the invention may be practiced without a separate flexible connecting portion.

The present invention also relates to a method of controlling an aquatic environment.

The present invention may be used to achieve a variety of objectives. For example, the neutrally buoyant synthetic structure may be used to remove excess nutrients from a freshwater pond, for example on a golf course. Controlling the amount of nutrients in the water is an efficient technique for preventing algal growth on the pond surface.

The neutrally buoyant structure may also be used to provide food and improve the quality of water in a commercial aquaculture sea pen.

The synthetic structure may be formed of a variety of materials, including flexible sheets, panels and/or ribbons. Separate layers may be used to perform separate buoyancy and water treatment/control functions.

An object of the invention is to provide a synthetic aquatic structure that is easy to handle and that maintains its biologically active portion in a stable position in the photic zone of a body of water.

Another object of the invention is to provide a method of using a synthetic structure to biologically control or improve the quality of an aquatic environment.

Another object of the invention is to provide a system for generating food, controlling water quality and providing shelter in an aquatic environment.

Another object of the invention is to encourage and support the production of a natural, regenerative food source for successful aquaculture production under a wide variety of conditions.

Another object of the invention is to provide a durable and economical system for simultaneously providing both food and shelter for aquatic species, for example for aquaculture purposes. By providing food and shelter in the same structure, a viable population of a given aquatic species may be maintained in a concentrated area.

Another object of the invention is to provide a system that can be economically adapted and tailored for different uses and conditions. For example, the growth of organisms may be enhanced by selectively modifying the surface structure and/or by providing desired nutrients in the surface structure. In addition, desired bacteria may be selectively implanted in the high surface area structure to create the desired biological effect in the water.

Another object of the invention is to reduce the reliance on formulated feeds in aquaculture operations. Such formulated feeds may omit important cofactors which are critical to immune function. The present invention may be used to provide a complete, natural diet for aquatic species.

Another object of the invention is to provide an economical and convenient system for biologically removing undesired or excessive nutrients and/or toxins from water. According to one aspect of the invention, both aerobic and facultatively anaerobic reactions may occur simultaneously and in close proximity to one another.

The term "neutrally buoyant" synthetic structure, as used herein, means a synthetic structure that has an overall density that is the same as or slightly less than the density of the supporting fluid. The supporting fluid may be seawater or fresh water, for example. In a preferred embodiment of the invention, the overall specific gravity of the neutrally buoyant synthetic structure (considering all the component parts of the structure, including the ballast portion, the active portion, etc.) is in a range of from (1) essentially equal to the specific gravity of the supporting fluid to (2) about 0.15 less than the specific gravity of the supporting fluid.

The "neutrally buoyant" nature of the synthetic structure causes it to operate in the supporting fluid according to the following three conditions: (1) the structure does not sink to the benthos (provided the depth of the supporting fluid is sufficiently greater than the height of the structure); (2) the structure floats near the surface of the supporting fluid; and (3) no more than a small portion of the structure extends above the surface of the supporting fluid.

Other features, objects and advantages of the invention will become apparent from the following detailed description and drawings illustrating preferred embodiments of the invention.

DETAILED DESCRIPTION OF PREFERRED EMBODIMENTS

Figure 1:
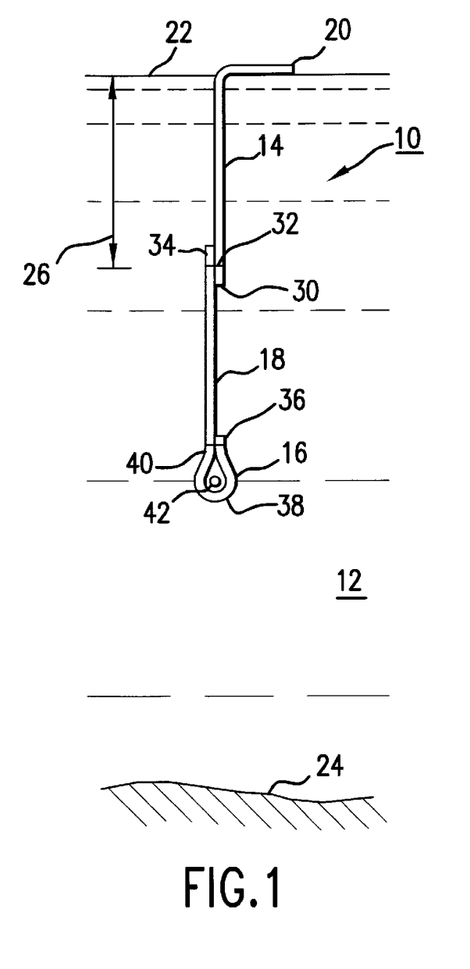
FIG. 1 is an end view of an aquatic structure constructed in accordance with the present invention.

Referring now to the drawings, where like elements are designated by like reference numerals, FIG. 1 shows a synthetic aquatic structure 10 floating in a body of water 12. The aquatic structure 10 has a flexible active portion 14, a ballast portion 16 and a flexible connecting portion 18.

The aquatic structure 10 as a whole is neutrally buoyant. As a result, the top edge 20 of the active portion 14 floats on or in the vicinity of the water surface 22. The ballast portion 16, however, has negative buoyancy. The ballast portion 16 applies downward force on the connecting portion 18 to maintain the aquatic structure 10 in a stable, substantially vertical position. In the illustrated embodiment, the ballast portion 16 does not sink to the benthos 24. Consequently, all or most of the active portion 14 is maintained in the photic zone 26.

Figure 2:
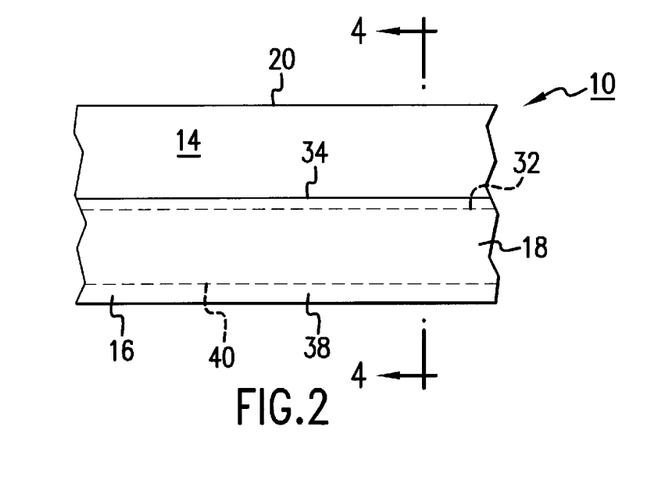
FIG. 2 is a partial front view of the aquatic structure of FIG. 1.
Figure 3:
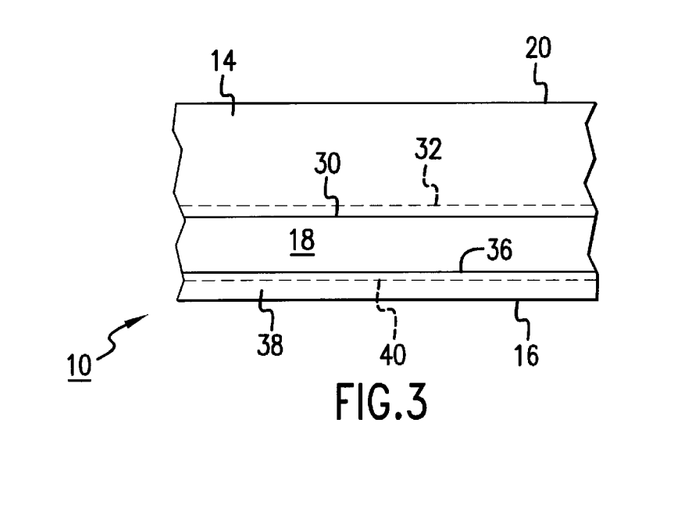
FIG. 3 is a partial back view of the aquatic structure of FIG. 1.

Referring now to FIGS. 2 and 3, the active portion 14 is preferably in the form of an elongated, flexible sheet or panel, with a bottom edge 30 parallel to the top edge 20. The bottom edge 30 may be connected to the connecting portion 18 by stitches 32. The connecting portion 18, like the active portion 14, may be in the form of an elongated, flexible sheet, with a top edge 34 and a bottom edge 36.

Figure 4:
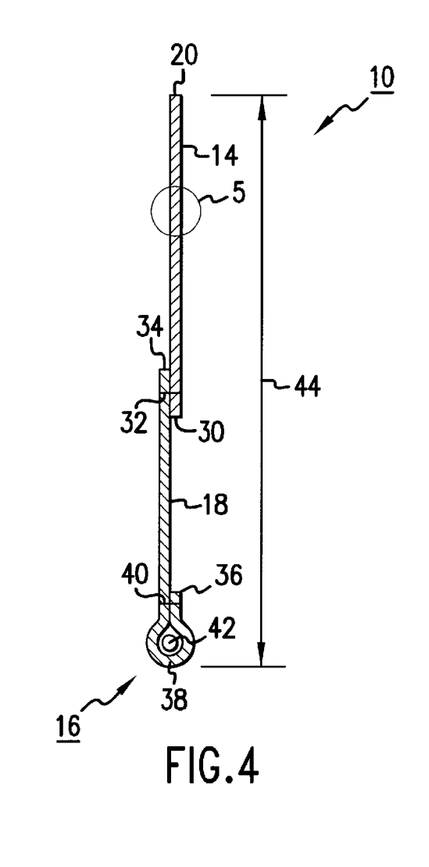
FIG. 4 is a cross sectional view of the aquatic structure of FIG. 1, taken along line 4—4 of FIG. 2.

The ballast portion 16 may be integrally formed in one piece with the connecting portion 18. That is, the connecting portion 18 may be folded over itself to form a tube 38 (FIG. 4) secured by stitches 40. Suitable ballast, such as a lead-shielded wire 42, may be located in the tube 38, as discussed in more detail below.

The body of water 12 (FIG. 1) may be seawater, freshwater or other aquatic systems and environments. As discussed in more detail below, the water 12 may be enclosed by an aquaculture sea pen (not shown). In another embodiment of the invention, the water 12 may be subjected to a heavy load of nutrients, such as nitrogen and phosphorous. According to one aspect of the invention, the body of water 12 may be a pond or stream located on or near a golf course.

The illustrated aquatic structure 10 may be, for example, ten meters in length. The height 44 (FIG. 4) of the structure 10 may be, for example, fifty to seventy five centimeters. The length and height 44 of the aquatic structure 10 may be adjusted depending on the conditions of use, handling considerations and other factors.

An important feature of the embodiment shown in FIGS. 1–4 is that the structure 10 does not have to be as tall (44) as the water 12 is deep. According to the invention, the height 44 of the structure 10 can be much less than the depth of the water 12, and yet the active portion 14 (where biological growth occurs) can be maintained in the photic zone 26. This feature may be especially advantageous in commercial sea pens which would otherwise be too deep to maintain the active portion 14 in the photic zone 26.

Figure 5:
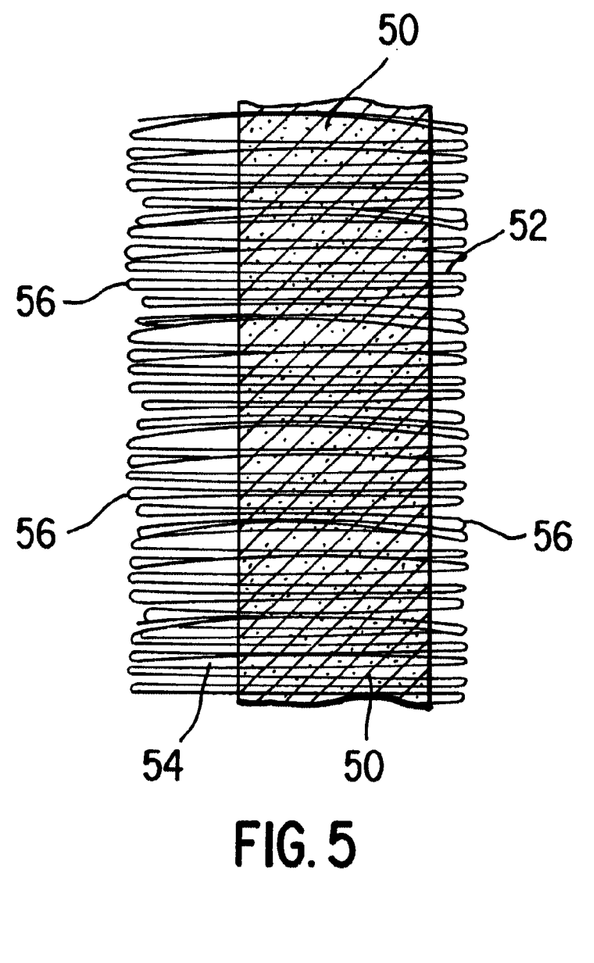
FIG. 5 is a detailed cross sectional view of the active portion of the aquatic structure of FIG. 1, taken on circle 5 of FIG. 4.

The active portion 14 may have a multi-layer structure as shown, for example, in FIG. 5. In particular, the active portion 14 may have a buoyant, closed cell foam layer 50 located between second and third layers 52, 54. The second and third layers 52, 54 are formed by needle punching thread 56 back and forth through the buoyant layer 50. The second and third layers 52, 54 provide high surface area structures.

Preferably, the thickness of the third layer 54 is greater than the thickness of the second layer 52. The third layer 54 may be, for example, about 0.040 inches thick. The second layer 52 may be less than about 0.016 inches thick. In addition, the permeability and diffusivity of the second layer 52 are preferably greater than those of the third layer 54.

In the illustrated embodiment, the buoyant layer 50 is about 0.095 inches thick. The thread 56 for the second and third layers 52, 54 is about five denier and provides an overall density of about four ounces per square yard. The distribution of the thread 56 between the second and third layers 52, 54 is about 30% and 70% respectively.

The thickness of the third layer 54 may be about 0.042 inches with a 10 gram per square centimeter load. The thickness of the second layer 52 is preferably about 0.016 inches. The permeability of the third layer 54 may be about 0.23 darcy at the surface of the foam layer 50. The permeability of the second layer 52 at the surface of the foam layer 50 is about 31 darcy. The total surface area of the active portion 14, 50–56 may be, for example, about five hundred sixty four square meters per square meter of surface, considering all pores down to forty angstroms.

The active portion 14, 50–56 can be used to promote aerobic and facultatively anaerobic reactions simultaneously in close proximity to one another. In particular, the aerobic reduction of ammonia can take place very rapidly within the second layer 52, near the surface of the buoyant layer 50, provided the structure 10 is located in water with a dissolved oxygen load of two to twelve milligrams per liter. The chemistry of the ammonia reduction reaction is as follows:

$$NH_4^+ + O_2 \longrightarrow NH_3OH + O^- \longrightarrow$$

$$NH_2OH \xrightarrow{O_2} NO_2 + 2H_2O$$

At the same time, the anaerobic reduction of nitrate can occur within the third layer 54 near the surface of the buoyant layer 50. Peroxidase surface analysis has shown that nitrate reduction can be limited exclusively to regions located relatively deep within the thicker third layer 54.

Thus, for example, a layer 54 of needle-punch felt with a density of at least about 1.5 ounces per square yard, and with the establishment of a biofilm and its detrial layer, may be used to prevent dissolved oxygen from reaching the surface of the buoyant layer 50, thereby creating sufficiently anaerobic conditions to support Nitrobacter, the primary genus involved in nitrite/nitrate reduction.

Diffusivities less than $D_{AB}=1\times10^{-6}$ square centimeters per second for water in the third layer 54 at the surface of the buoyant layer 50 generally produce sufficiently low oxygen mass transport rates through the third layer 54 to allow anaerobic conditions to become established. The addition of a bacterial layer of detrius inside the pore structures within the third layer 54 further reduces the permeability and thereby also reduces diffusivity.

The much more open second layer 52 allows mass transfer of oxygen limited only by the concentration gradient of the gas in the water. Oxygen utilization is only used in bacterial aerobic digestion of solutes transported by diffusion in the water, and the rates of diffusivity for gases in fluids are typically an order of magnitude higher than that of inorganic solutes (nitrates and nitrites).

Further, the closely associated periphytic algal layer at the outermost surface of the second layer 52 produces oxygen in the presence of sunlight (in the photic zone 26), thereby increasing the local gradient for oxygen saturation in the vicinity of the second layer 52.

The two diffusivity phenomenon discussed above, controlled by the permeability of the active portion 14, 50–56, allow anaerobic and aerobic processes to proceed simultaneously only microns apart. Thus, the active portion 14, 50–56 may operate as a biological filter. With the present invention, water contaminated with high levels of nitrates, nitrites, and ammonia can be treated by a single filter type at very high mass transfer rates. Thus, for example, the invention may be particularly useful in the treatment of fertilizer runoff from golf courses and in the treatment of agricultural runoff in constructed wetlands.

Figure 6:
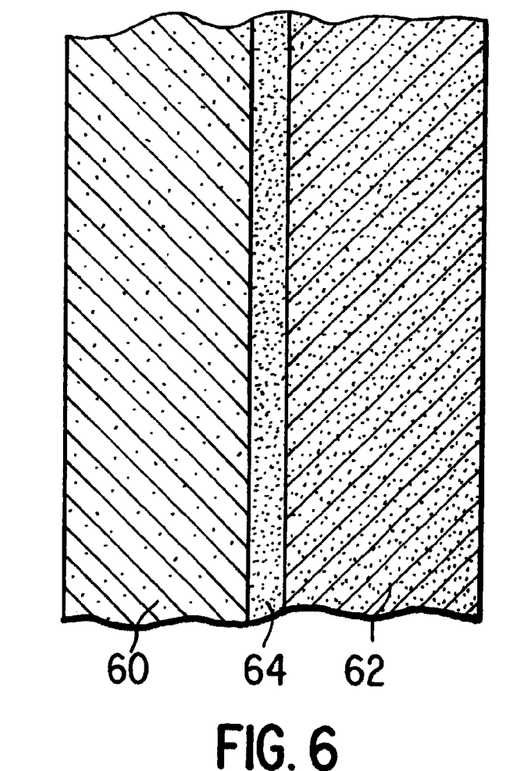
FIG. 6 is a detailed cross sectional view of another aquatic structure constructed in accordance with the present invention.

In an alternative embodiment of the invention, the active portion 14 may be constructed of the layered structure shown in FIG. 6. In the FIG. 6 embodiment, the active layer has first and second layers 60, 62. The layers 60, 62 are integrally secured together by a suitable extruded adhesive 64. Other adhesive materials or other securing means may be employed instead of the extruded adhesive 64, if desired. The first layer 60 provides buoyancy. The second layer 62 provides a high surface area structure for enhanced aquatic growth. The layers 60, 62 are generally coextensive with the active portion 14. In other words, each layer 60, 62 extends along and across substantially the full length and width of the flexible active portion 14.

In the illustrated embodiment, the first layer 60 is formed of a closed cell polyethylene foam about 2.2 millimeters thick. In alternative embodiments, the closed cell foam of the first layer 60 may be formed of polyurethane, polypropylene or another suitable material. The foam material may have a specific gravity of from 0.05 to 0.6 grams per cubic centimeter, more preferably 0.15 to 0.2 grams per cubic centimeter, even more preferably about 0.19 grams per cubic centimeter. Preferably, the active portion 14 has a specific gravity in the range from 0.15 to 0.25 grams per cubic centimeter.

The second layer 62 is formed of an open cell polyethylene foam. The open cell foam material has a reticulated open pore surface structure to support and thereby promote biological growth. The open cell material provides anchorage for periphytic organisms. To enhance the growth of algae, the cell size of the open pore structure should preferably be larger than about twenty microns and less than about two thousand microns.

In the illustrated embodiment, the second layer 62 has an average pore size of about two hundred microns. The surface area of the open cell material for the second layer 62 may be at least about 1.9 square meters per gram, preferably greater than 20.0 square meters per gram. Preferably, the second layer 62 is thin enough to permit a controlled mass transfer of nutrients through the surface structure. In the illustrated embodiment, the thickness of the second layer 62 is about 1.0+/−0.2 millimeters.

In another preferred embodiment of the invention, the active portion 14 may have a second layer 72 (FIG. 7) formed of a spun polyester batting. The batting material provides a holdfast surface for enhanced biological growth. Other than the second layer 72, the structure shown in FIG. 7 is substantially the same as the one shown in FIG. 6.

Figure 7:
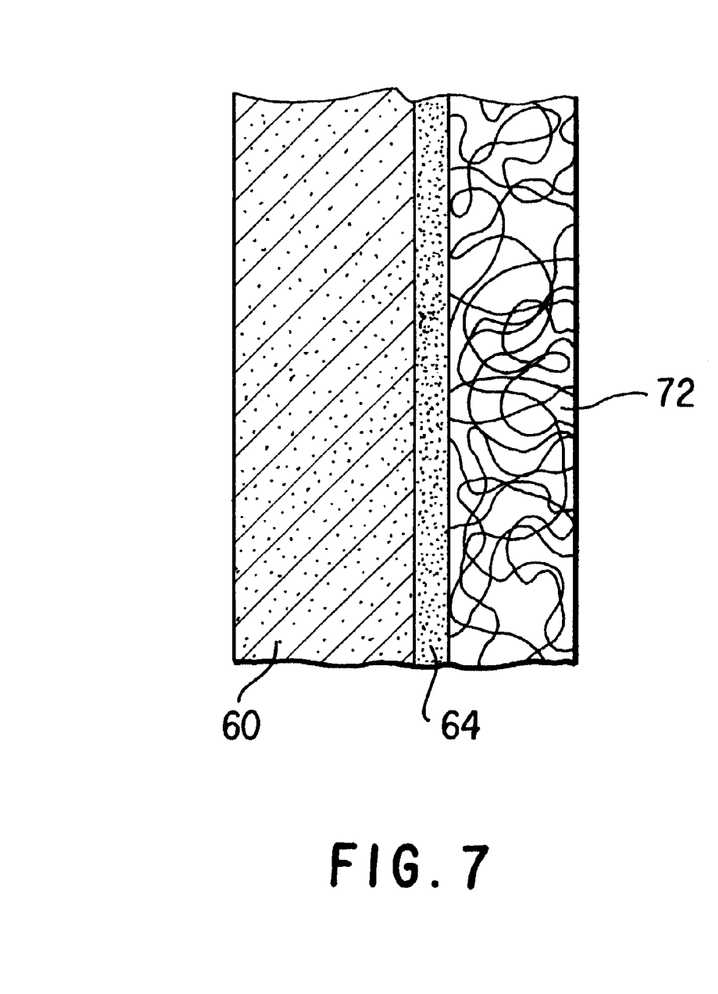
FIG. 7 is a detailed cross sectional view of yet another aquatic structure constructed in accordance with the present invention.

The batting material 72 shown in FIG. 7 may have the same physical and functional characteristics as the batting materials described in U.S. patent application Ser. No. 09/134,735.

Figure 8:
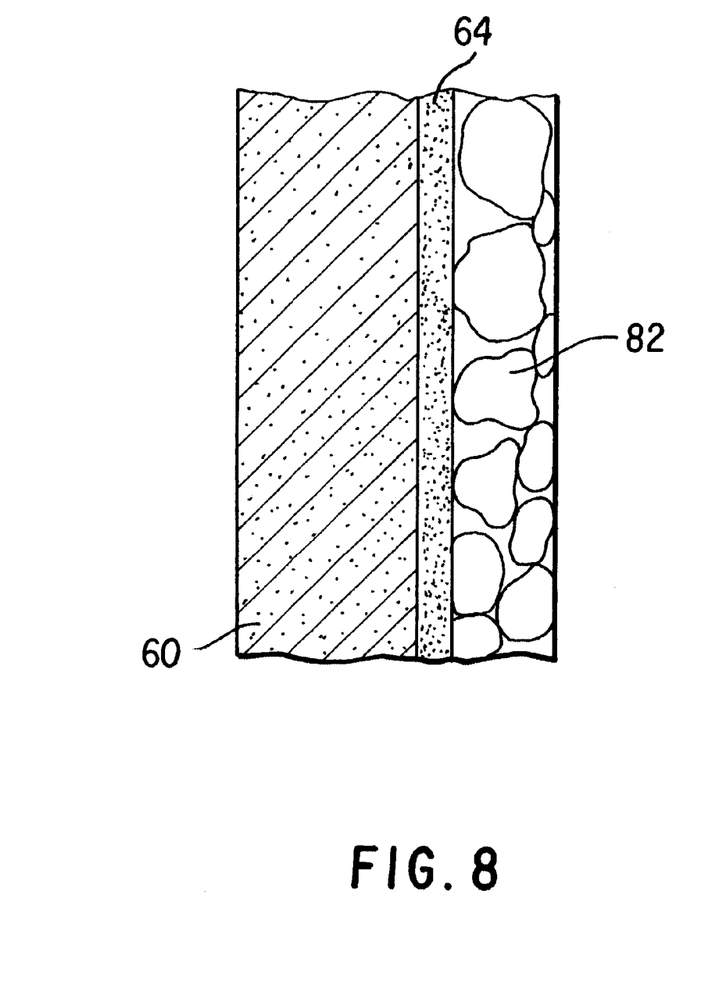
FIG. 8 is a detailed cross sectional view of yet another aquatic structure constructed in accordance with the present invention.

According to another preferred embodiment of the invention, the active layer 14 may have the layered structure shown in FIG. 8. The structure shown in FIG. 8 has a second layer 82 with a microporous surface structure. The microporous surface structure is preferentially composed of pores (not illustrated) that are too small to allow the growth of typical periphytic algal species.

Accordingly, the predominant growth within the pores of the layer 82 would be limited to picoplankton which is predominantly bacterial in nature. The structure and operation of the pores in the layer 82 are described in more detail in U.S. patent application Ser. No. 09/134,735, the entire disclosure of which is incorporated herein by reference.

By embedding appropriate nutrients in the pores, the growth of picoplankton can be selectively enhanced for bacteria desired for specific purposes such as cleansing of the environment. Thus, the synthetic aquatic structure can be tailored for one or more specific uses by preselecting a desired high surface area structure and/or providing selected nutrients within the pores. In an alternative embodiment of the invention, selected bacteria can be implanted in the pores.

Thus, according to one aspect of the invention, an array of synthetic aquatic structures 10 each with different, selected nutrients can be used to create an artificial wetland for the removal and complexation of excess nitrate and phosphorous compounds.

The materials used in the aquatic structure 10 should preferably be composed of polymers which do not leach harmful chemicals into the environment. The materials preferably do not decompose in water (including seawater) and sunlight. Consequently, the aquatic structures 10 may be used for long periods of time and may be cleaned, reused and/or transported. If desired, the active portion 14 may include one or more additional layers (not illustrated) or materials for reinforcing, preserving or protecting the active portion 14.

In a preferred embodiment of the invention, the aquatic structure 10 is made up entirely of the materials described above, and has no discrete buoyant components or other means for maintaining the active portion 14 in the photic zone 26. In the preferred embodiment, all of the buoyancy of the aquatic structure 10 is supplied by the flexible materials of the active portion 14 and the connecting portion 18.

The connecting portion 18 may be formed of polymeric fibril material. If desired, the connecting portion 18 may be neutrally buoyant or nearly neutrally buoyant itself to make it easier to establish the desired neutral buoyancy for the entire structure 10 without requiring an excessive amount of ballast material. According to one aspect of the invention, the connecting portion 18 may be formed of a durable spun polyester batting material that helps promote biological growth.

As noted above, the ballast portion 16 may include a lead wire 42. The wire 42 may be coated to preclude interaction with the water 12. Alternatively, the tube 38 may be filled with granular ballast material, such as sand, crushed rock, bismuth shot or another available material. The ballast portion 16 provides sufficient negative buoyancy to equalize the buoyancy of the connecting portion 18 and the submerged portion of the active portion 14. The structure 10 as a whole has neutral buoyancy and floats in the photic zone 26 in the manner shown in FIG. 1 without the ballast portion 16 contacting the benthos 24.

Figure 9:
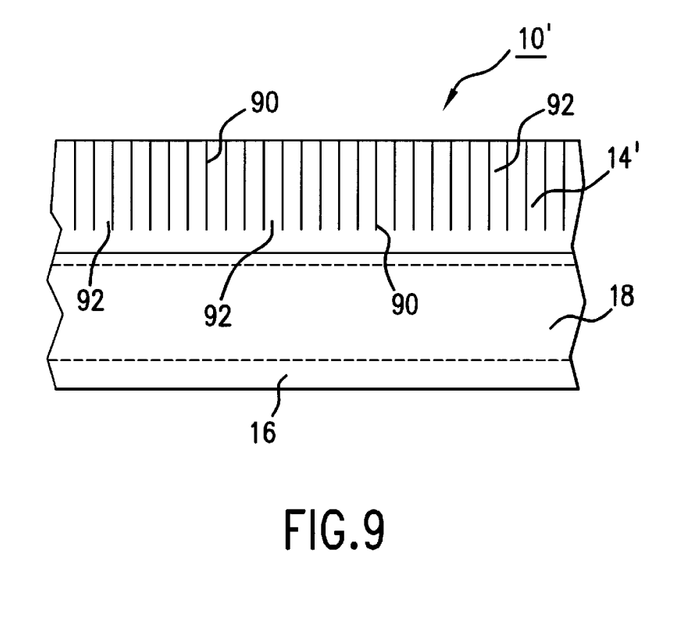
FIG. 9 is a partial front view of yet another aquatic structure constructed in accordance with the present invention.

According to another preferred embodiment of the invention, shown in FIG. 9, the aquatic structure 10' has an active portion 14' with slits 90 perpendicular to its length at about two and one-half centimeters intervals to produce ribbons 92. In practice, the ribbons 92 move independently of each other in the water in a wavy fashion. This wave motion assists in the mass transfer of nutrients to and from the surfaces of the ribbons 92. The present invention should not be limited to the preferred embodiments shown and described herein.

In operation, one or more of the synthetic structures 10 may be installed in a body of water, such as a golf course pond or a sea pen. The aquatic structure 10 is relatively light weight, flexible and easy to handle. Consequently, the structure 10 may be installed in the water 12 with little or no special equipment. Divers are not needed to anchor the structure 10 to the benthos 24.

Over time, biological growth develops on the high surface area structure of the active portion 14. The growth gradually reduces the overall buoyancy of the structure 10. As the buoyancy is reduced, the ballast portion 16 may sink slightly deeper into the water 12. Eventually, the structure 10 may be removed, cleaned and returned to the water 12. If desired, the biological material cleaned from the structure 10 may be recycled as fertilizer. The structure 10 may be cleaned by a squeegee or by spraying it with clean water, for example.

A suitable reel (not illustrated) may be used to withdraw the synthetic structure 10 from the water 12. Since the structure 10 is flexible, a single person may conveniently wind it up on a reel for removal or storage. Since the structure 10 is easy to handle, it may be used in a remote portion of the pond. It may not be necessary to maintain it near the shore. In addition, a plurality of aquatic structures 10 may be used simultaneously in the same body of water 12.

Figure 10:
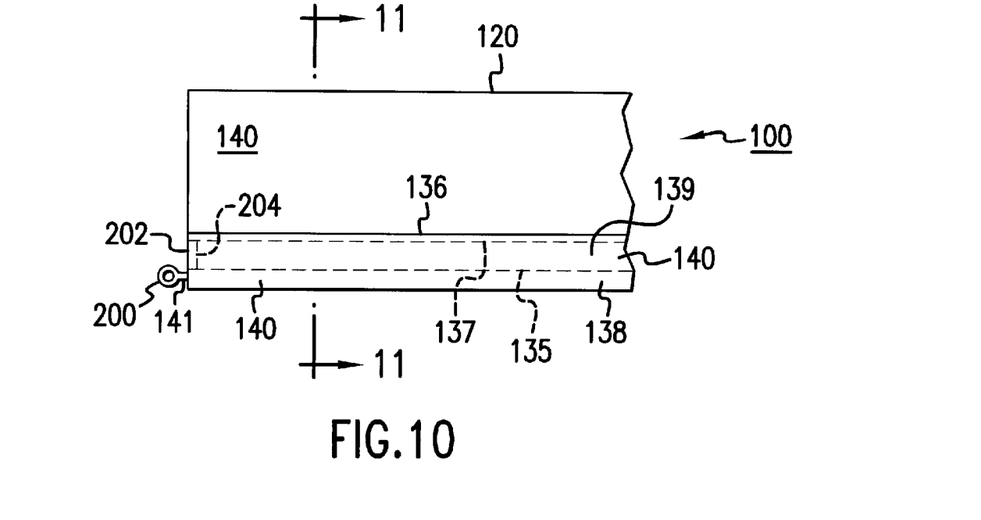
FIG. 10 is a partial front view of yet another aquatic structure constructed in accordance with the present invention.
Figure 11:
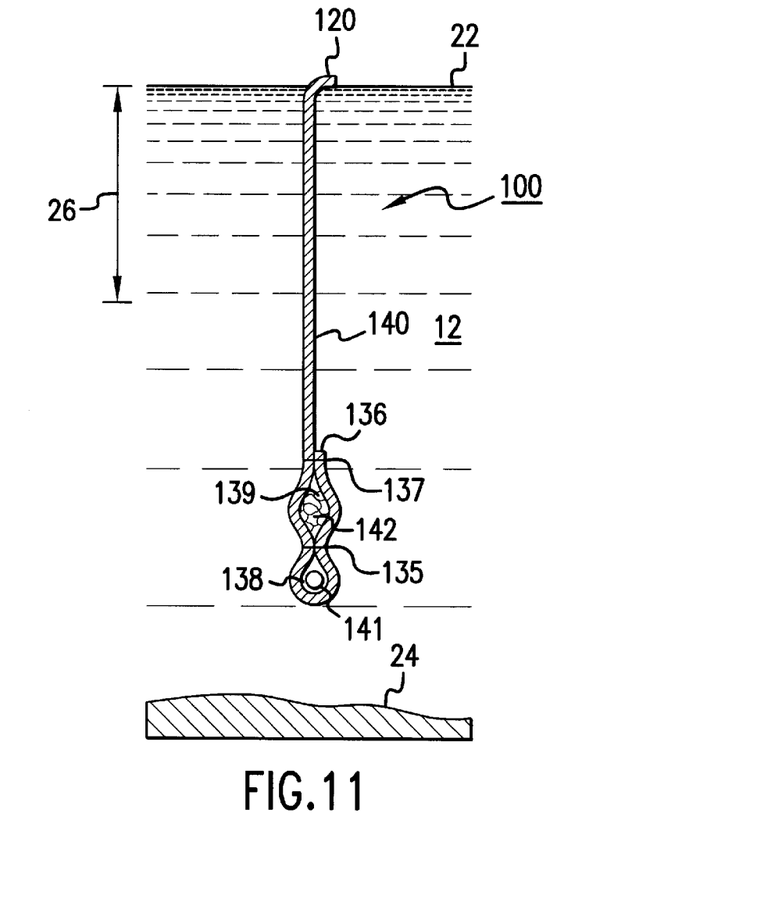
FIG. 11 is a cross sectional view of the aquatic structure of FIG. 10, taken along the line 11—11.

Referring now to FIG. 10, there is shown a synthetic aquatic structure 100 constructed in accordance with another preferred embodiment of the present invention. The synthetic structure 100 floats in a supporting body of water 12 (FIG. 11). The synthetic structure 100 as a whole is neutrally buoyant with respect to the supporting fluid 12. Consequently, the synthetic structure 100 floats near the water surface 22, with no portion or a small portion 120 of the structure 100 extending above the water surface 22. The synthetic structure 100 does not sink to the benthos 24. All or at least a significant portion of the structure 100 floats within the photic zone 26.

The synthetic structure 100 includes flexible material 140. The flexible material 140 may be formed of any of the materials described above for the active portion 14 of the structure shown in FIG. 1, for example, and the flexible material 140 may be formed of other materials. Preferably, the flexible material 140 includes high surface area material for promoting biological growth, water treatment and/or food development in the photic zone 26, in the manner described above in connection with the active portion 14.

The bottom end 136 of the flexible material 140 is folded over itself and stitched at two locations 135, 137 to form two pockets 138, 139. Each pocket 138, 139 extends the full length of the structure 100. The first pocket 138 contains a polyester rope 141 with end rings 200 (FIG. 10). There is one ring 200 at each end of the rope 141, although only one ring 200 is shown in the drawings for the sake of clarity of illustration.

Another suitable tension member other than the polyester rope 141 and connectors others than the illustrated rings 200 may be employed instead of the illustrated arrangement, if desired. The rings 200 may be connected to like rings on adjacent, similarly constructed structures 100 (not illustrated) to form a series of connected structures 100 that may be installed and pulled from the body of water 12 together by a single reel (not illustrated). Thus, the rope 141 may be used both for handling the illustrated structure 100 and for interconnecting like structures 100 end to end.

The second elongated pocket 139 may be filled with a measured amount of ballast material 142 (FIG. 11). The ballast material 142 may be gravel or another suitable material. The ballast material 142 is measured before it is installed into the second pocket 139 to provide the structure 100 with the desired neutral buoyancy. The desired amount of ballast material 142 may depend on the specific gravity of the supporting fluid 12 and other factors. After the second pocket 139 is filled with the desired amount of ballast material 142, the ends 202 of the second pocket 139 may be closed by stitches 204 (only one end 202 of the structure 100 is shown in the drawings for the sake of clarity of illustration).

The above descriptions and drawings are only illustrative of preferred embodiments which can achieve and provide the objects, features and advantages of the present invention. It is not intended that the invention be limited to the embodiments shown and described in detail herein. Modifications coming within the spirit and scope of the following claims are to be considered part of the claimed invention.

What is claimed is:

1. A synthetic structure for removing nutrients from water, said structure comprising:
   flexible buoyant material;
   a high surface area structure for promoting biological growth in said water; and
   a ballast portion connected to said high surface area structure, and wherein said synthetic structure is neutrally buoyant in said water.

2. The synthetic structure of claim 1, wherein said buoyant material includes closed cell foam.

3. The synthetic structure of claim 2, wherein said high surface area structure includes needle punched thread.

4. The synthetic structure of claim 3, wherein said ballast portion includes an elongated ballast structure.

5. The synthetic structure of claim 3, further comprising an elongated tension member for connecting said synthetic structure to another structure.

6. The synthetic structure of claim 5, wherein said tension member includes a rope.

7. The synthetic structure of claim 2, wherein said high surface area structure includes open cell foam.

8. The synthetic structure of claim 2, wherein said high surface area structure includes polyolefin or spun polyester batting.

9. The synthetic structure of claim 2, wherein said high surface area structure includes microporous granular particles.

10. A neutrally buoyant synthetic structure for removing nutrients from water, said structure comprising:
    flexible buoyant material;
    a high surface area structure for promoting biological growth; and
    a ballast portion connected to said high surface area structure;
    wherein said buoyant material includes closed cell foam;
    wherein said high surface area structure includes needle punched thread;
    wherein said neutrally buoyant synthetic structure further comprises an elongated tension member for connecting said synthetic structure to another structure; and
    wherein said neutrally buoyant synthetic structure further comprises granular ballast material, and wherein said tension member and said ballast material are located in first and second elongated pockets, said pockets being formed of a single sheet of flexible material, and wherein said single sheet of flexible material includes said high surface area structure.

11. A synthetic structure for providing food for biological species, said synthetic structure comprising:
    a flexible active portion for promoting biological growth; and
    a ballast portion for stabilizing said synthetic structure in a body of water;
    wherein said synthetic structure is neutrally buoyant such that said flexible active portion is maintained in the photic zone of the body of water.

12. The synthetic structure of claim 11, further comprising a flexible buoyant connecting portion connected to said active portion and said ballast portion.

13. The synthetic structure of claim 12, wherein said connecting portion includes fibril material.

14. A synthetic structure for providing food for biological species, said synthetic structure comprising:
    a flexible active portion for promoting biological growth; and
    a ballast portion for stabilizing said synthetic structure in a body of water;
    wherein said synthetic structure is neutrally buoyant such that said flexible active portion is maintained in the photic zone of the body of water;
    wherein said synthetic structure further comprises a flexible buoyant connecting portion connected to said active portion and said ballast portion;
    wherein said connecting portion includes fibril material; and
    wherein said active portion includes a sheet of buoyant material and needle punched thread extending through said sheet of buoyant material.

15. A method of controlling an aquatic environment, said method comprising the steps of:
    locating a neutrally buoyant synthetic structure in a body of water, said body of water having a benthos;
    causing a flexible active portion of said synthetic structure to float within a photic zone of said body of water;
    causing water within said photic zone to contact a high surface area structure in said flexible active portion; and
    using a ballast portion connected to said flexible active portion to stabilize and orient said neutrally buoyant synthetic structure in said body of water, and wherein said step of locating said neutrally buoyant synthetic structure in said body of water includes the step of suspending said ballast portion in said body of water above and spaced apart from said benthos.

16. The method of claim 15, wherein said body of water includes freshwater and excess nutrients.

17. The method of claim 16, further comprising the step of biologically accumulating said nutrients on said synthetic structure.

18. A method of controlling an aquatic environment, said method comprising the steps of:
    locating a neutrally buoyant synthetic structure in a body of water;
    causing a flexible active portion of said synthetic structure to float within a photic zone of said body of water;
    causing water within said photic zone to contact a high surface area structure in said flexible active portion; and
    using a ballast portion connected to said flexible active portion to stabilize and orient said neutrally buoyant synthetic structure in said body of water; and
    wherein said body of water includes seawater located in a sea pen.

19. The method of claim 18, further comprising the step of using said synthetic structure to provide food for aquatic organisms in said sea pen.

20. A method of controlling an aquatic environment, said method comprising the steps of:
    locating a neutrally buoyant synthetic structure in a body of water;
    causing a flexible active portion of said synthetic structure to float within a photic zone of said body of water;
    causing water within said photic zone to contact a high surface area structure in said flexible active portion;

using a ballast portion connected to said flexible active portion to stabilize and orient said neutrally buoyant synthetic structure in said body of water; and removing said synthetic structure from said body of water.

21. The method of claim 20, further comprising the steps of cleaning said synthetic structure and returning said synthetic structure to said body of water, wherein said cleaning step occurs subsequent to said removing step, and wherein said returning step occurs subsequent to said cleaning step.

22. The method of claim 21, further comprising the step of connecting an end of said synthetic structure to an end of a second neutrally buoyant synthetic structure.

* * * * *